United States Patent
Sathyanarayana et al.

(10) Patent No.: US 9,880,046 B2
(45) Date of Patent: Jan. 30, 2018

(54) METHOD, APPARATUS AND SYSTEM FOR PORTABLE DEVICE SURFACE AND MATERIAL ANALYSIS

(71) Applicant: Texas Instruments Incorporated, Dallas, TX (US)

(72) Inventors: Amardeep Sathyanarayana, Austin, TX (US); Nitish Murthy, Allen, TX (US); Sourabh Ravindran, Dallas, TX (US); Brian Paul Burk, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 183 days.

(21) Appl. No.: 14/712,658

(22) Filed: May 14, 2015

(65) Prior Publication Data
US 2015/0330831 A1    Nov. 19, 2015

Related U.S. Application Data

(60) Provisional application No. 61/993,519, filed on May 15, 2014, provisional application No. 61/993,534, filed on May 15, 2014.

(51) Int. Cl.
*G01H 1/00* (2006.01)
*G01H 13/00* (2006.01)
*G01H 3/08* (2006.01)

(52) U.S. Cl.
CPC ............. *G01H 3/08* (2013.01); *G01H 1/00* (2013.01); *G01H 13/00* (2013.01)

(58) Field of Classification Search
CPC .................................................... G01H 13/00
USPC ............................................................ 73/579
See application file for complete search history.

(56) References Cited

U.S. PATENT DOCUMENTS

| | | | | |
|---|---|---|---|---|
| 4,409,064 A * | 10/1983 | Vora | | C01B 17/88 159/31 |
| 7,938,009 B2 * | 5/2011 | Grant | | H04M 1/24 73/649 |
| 2007/0244641 A1 * | 10/2007 | Altan | | B60Q 9/008 701/300 |
| 2007/0296366 A1 * | 12/2007 | Quaid | | B25J 9/1638 318/568.16 |
| 2008/0294984 A1 * | 11/2008 | Ramsay | | G06F 1/1626 715/702 |
| 2010/0156818 A1 * | 6/2010 | Burrough | | G06F 3/016 345/173 |
| 2010/0179587 A1 * | 7/2010 | Grant | | A61B 17/2909 606/205 |

* cited by examiner

*Primary Examiner* — J M Saint Surin
(74) *Attorney, Agent, or Firm* — Gregory J. Albin; Charles A. Brill; Frank D. Cimino

(57) ABSTRACT

A method and apparatus for determining properties of at least one of a surface or materials adjacent to a portable device. The method includes windowing a segment of the received signal to remove an edge transients, computing the FFT power spectral density of the signal, determining a peak in the spectral energy at a frequency, finding local peaks by determining the difference in the signal amplitude is relation to a pre-determined threshold, and computing harmonic energy according to the local peaks and the difference and determining at least one property of the surface or material.

20 Claims, 2 Drawing Sheets

METHOD, APPARATUS AND SYSTEM FOR PORTABLE DEVICE SURFACE AND MATERIAL ANALYSIS

CROSS REFERENCES TO RELATED APPLICATIONS

This application claims priority from U.S. Provisional Patent Application No. 61/993,519 and 61/993,534 filed on May 15, 2014, which are hereby incorporated by reference in their entirety.

BACKGROUND OF THE INVENTION

Field of the Invention

Embodiments of the present invention generally relate to a method, apparatus and system to determining surface and/or materials on which a portable device is situated.

Description of the Related Art

Determining the type of surface or materials surrounding a portable device is important. In many situations, such surfaces or materials may affect the functionality and analysis of the portable device modules, such as Haptics technology or kinesthetic communication. Haptic technology or kinesthetic communications are tactile feedback technologies which recreate the sense of touch by applying forces, vibrations, or motions to the user. This mechanical stimulation can be used to assist in the creation of virtual objects in a computer simulation, to control such virtual objects, and to enhance the remote control of machines and devices. Thus, in general, haptics is the sense of touch. In haptics, sensation can be artificially created by vibrating motor or other actuators. These vibrations can be varied to provide a wide range of tactile feedback to the users.

Therefore, there is a need for a method, apparatus and system for detecting the materials and surface adjacent to a portable device.

SUMMARY OF THE INVENTION

Embodiments of the present invention relate to a method and an apparatus for determining properties of at least one of a surface or materials adjacent to a portable device. The method includes windowing a segment of the received signal to remove an edge transients, computing the FFT and power spectral density of the signal, determining a peak in the spectral energy at a frequency, finding local peaks by determining the difference in the signal amplitude is relation to a pre-determined threshold, and computing harmonic energy according to the local peaks and determining at least one property of the surface or material.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Surface and material analysis is important in identifying the context and surrounding environment for a touch based user interface device (vibration mode on a solid table is significantly louder than on a couch). Identifying the context is crucial to customize touch simulation for better human machine interaction. Surface properties, such as, smoothness, friction and texture are analyzed using temporal changes in the accelerometer signal using motion against the test surface. Haptic actuation may be used against the test material. The response for the haptic actuation may be captured by means of an inbuilt (or external) accelerometer and microphone. The received signal is analyzed to identify surface characteristics.

Haptics is gaining importance in an active sensory mode. Realistic haptic actuation and its sensation vary due to a number of factors. Along with mounting and design location, one of the important factors affecting sensation is the material property of the contact or adjacent surface, which vibrates due to haptics actuation. The vibrations, caused by the haptics actuation, spread through the surface and into the material based on the material properties, such as, mass, damping, elasticity, resonant frequency, etc. The way these vibrations spread through materials affect the overall sensation of the actuation. Currently, smoothness, friction and texture may not be sufficient, because they do not give a clear idea of the material properties for understanding and feeling the surrounding environment.

In one embodiment, a haptic actuator based automated procedure is used to ensure consistent surface and material analysis and/or detection. Sensors, accelerometer and/or microphone may be used along with the haptics actuator. The proposed is to detect different material surfaces based on active sensing by actuating a surface and analyzing the response of that surface to the haptics vibration. For example, a portable-device, such as a phone, may be placed on a pillow, lap and a table. In each scenario, the vibration effects and sounds would be different. For example, in lap or pillow, the phone would be hard to hear. Whereas, on a table, the vibrations would be louder.

Figure 1:
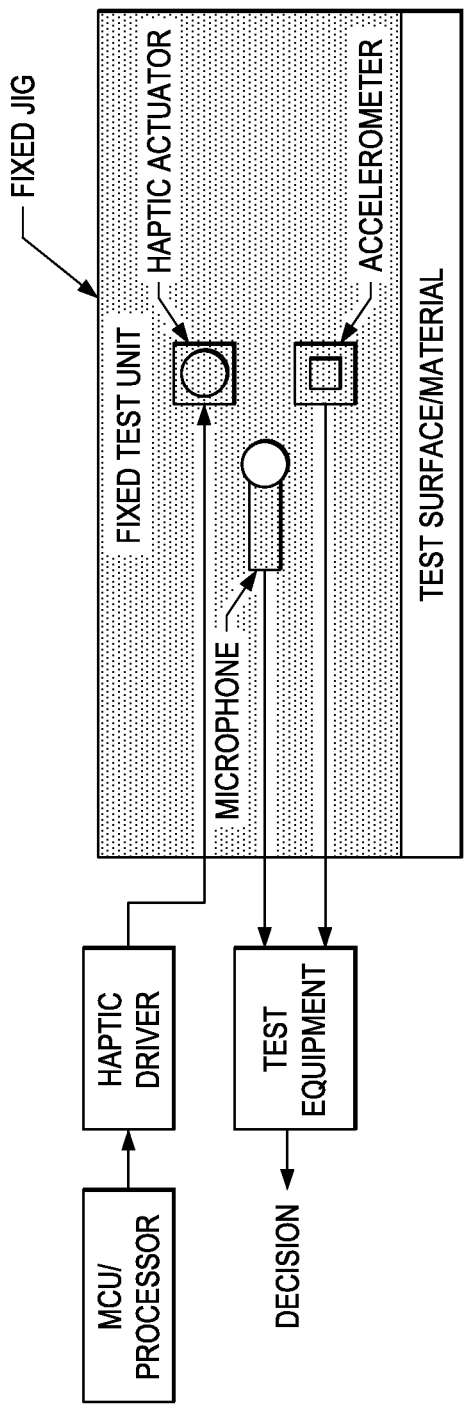
FIG. 1 is an embodiment of a block diagram of a haptic surface and/or material analysis setup.

FIG. 1 is an embodiment of a block diagram of a haptic surface and/or material analysis setup. In FIG. 1, the setup has two sensors, though any number of sensors may be used. Thus, 3 axis accelerometer and an Omni-directional microphone may also be used along with the haptic actuator. In this embodiment, the haptic actuator is mounted on a known fixed surface/device, a fixed test unit (FTU) or Jig, which usually remains the same for most surface/materials test. This FTU is placed on top or adjacent to an unknown surface whose material properties are to be analyzed. The haptic actuator is actuated to a specific pattern, for example by a micro-controller unit (MCU) or processor through the appropriate haptic driver. The test equipment synchronously captures and processes the microphone and accelerometer data when the haptic device on the FTU is actuated.

Figure 2:
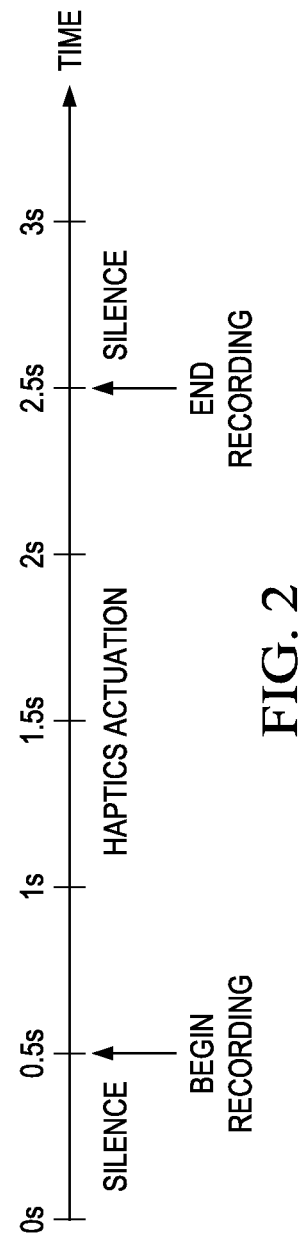
FIG. 2 is an embodiment of a data recording and actuation sequence.

An example of the test procedure sequence is shown in FIG. 2. Once the FTU is setup with the sensors and actuator, it is ready for surface/material analysis by placing the FTU on the surface of different materials. To remove any physical movement of the device and/or the surface, there is a short duration of no activity (called silence). Following this silence, the test equipment starts recording the microphone and accelerometer data. In this duration, the haptics device is not actuated. This duration helps in capturing any ambient noise or variations that might exist in the surroundings and has to be corrected for during the decision making stage. The haptic device is actuated by the MCU/processor through the haptic driver for a short amount of time.

FIG. 2 is an embodiment of a data recording and actuation sequence. In FIG. 2, the example device is shown to be actuated for 1 sec. However, this duration is usually appropriately selected based on the haptic actuator specifications, to account for transient and steady state of the actuator. Once the actuator is stopped, there may be a small duration of time which is provided for any decaying transients and for capturing any reflections from the fixed surface Jig and the test material. Throughout this duration, both the sensor data are synchronously recorded in the test equipment. The recording is stopped and the data is processed to analyze the surface/material characteristic related changes. The silence period after the recording is to ensure that the FTU or the test material can be removed and the next material can be placed for evaluation.

Figure 3:
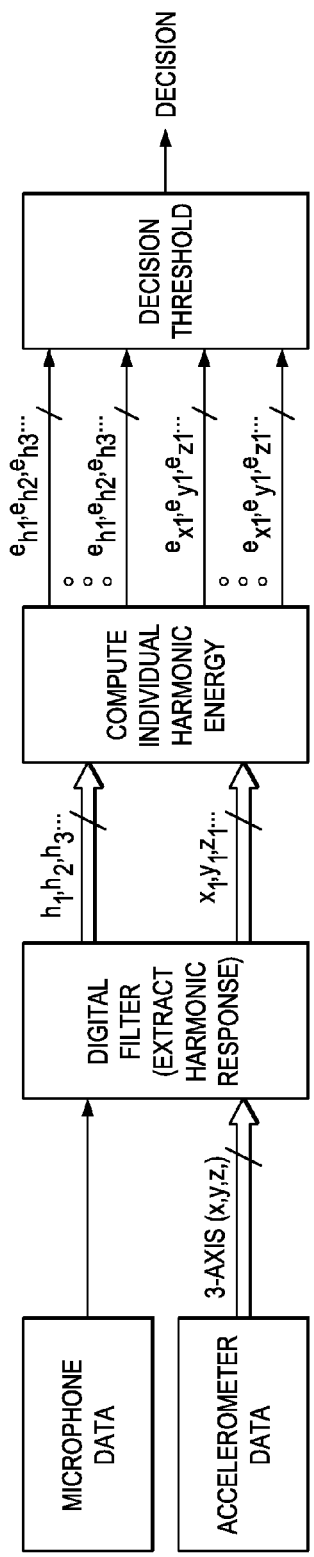
FIG. 3 is an embodiment of a block diagram of signal processing and decision making.

In one embodiment, once the data has been recorded, it is further analyzed. FIG. 3 is an embodiment of a block diagram of signal processing and decision making. Thus, FIG. 3 shows an embodiment of steps for performing the analysis. To remove any noise artifacts and to capture the resonating response of the haptic actuation on the test material, the data is parsed through a digital filter through, where the harmonic frequency response from the signal is extracted. The energy in these harmonics is computed and then passed to the decision threshold stage. This decision threshold stage can be setup in different ways, for example, compare the resonant response of the test material to that of the previous test material and obtain a comparative evaluation between the two test materials or compare the resonant response of the test material to that of fixed preset values of a known material which can be used as an absolute reference.

Following the decision threshold approaches, the test surface/material may be comparatively evaluated for various properties, such as, vibration dampening and hardness. While the strength of the resonant frequency is indicative of the vibration dampening characteristic, strength and number of harmonics suggest material surface hardness. An immediate extension of this surface and material analysis is the ability to detect ripeness and other qualities of fruits, such as, watermelon. Knowing surface and material characteristics of different objects can ensure the substance to be used for various applications.

Figure 4:
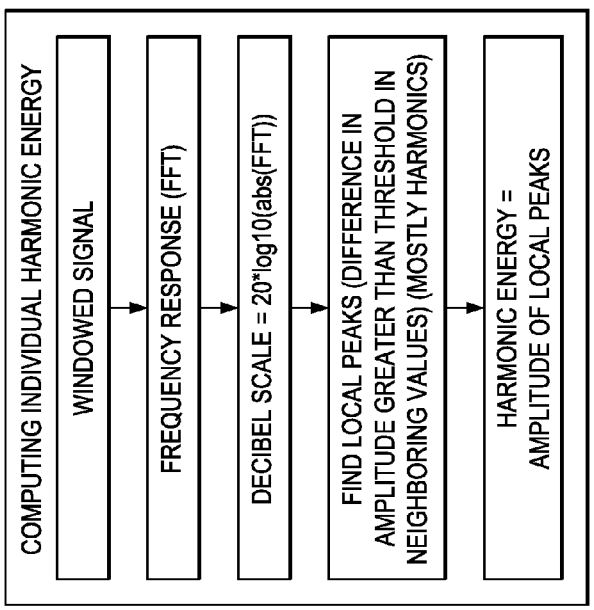
FIG. 4 is an embodiment of a method for computing a harmonic energy of the signal at local frequency peaks.

FIG. 4 is an embodiment of a method for computing a harmonic energy of a signal at individual frequency peaks. In this example, either accelerometer and/or microphone data may be used. A segment of the received signal is windowed to remove any edge transients and their FFT is computed. The power spectral density of the signal is computed, for example by taking $20*\log_{10}(abs(FFT))$. Since the haptics actuator is vibrated at a certain frequency, there is usually a peak in the spectral energy at that frequency. Similarly, based on the material properties, such as, mass, elasticity, damping and resonant frequency, there are usually many other peaks of varying amplitude in the spectral energy. These peaks are identified by searching for regions where there is a sudden drop in the neighboring amplitudes. These local peak locations and their amplitudes are recorded as features. Generally, these peaks occur at multiples of the vibrating or resonant frequency of the substance. Hence, they are termed as individual harmonic energy for convenience.

Figure 5:
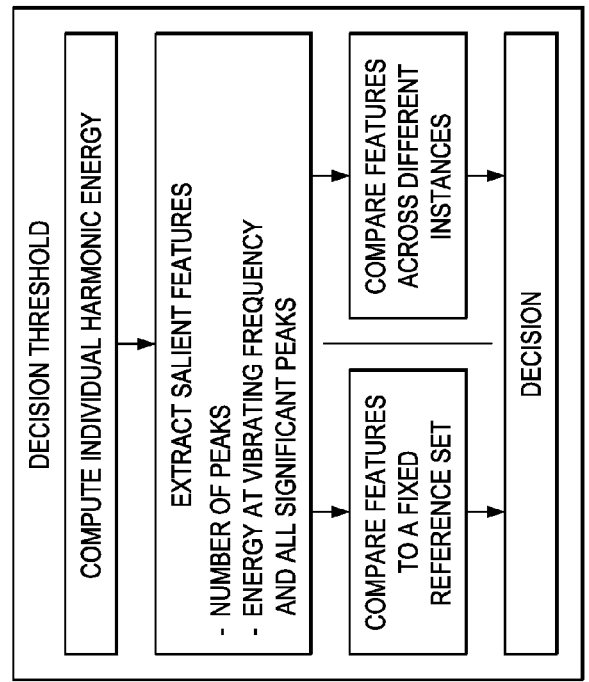
FIG. 5 is an embodiment of a method for extracting features and taking decision.

FIG. 5 is an embodiment of a method for extracting features and taking decision. FIG. 5 shows an example of the steps followed for the threshold based decision scheme. The total energy in these harmonics is computed and then passed to the decision threshold stage. There are various schemes, such as, classification schemes, threshold based schemes, clustering techniques, etc., which could be adopted to make a decision. By comparing the number of peaks and their amplitudes with previously saved values, a threshold (fixed or adaptive) based scheme can be used to either classify or cluster the captured data.

In the case of production line testing, since the fixed jig on a fixed test surface will produce a known reference excitation for the haptics vibration, the number of peaks and their energies can be used as a reference. When the new haptics device under test (jig) vibrates the fixed test surface, if the number of peaks and their energies are comparable within a set threshold, then the haptics device under test is a good match, else it fails the matching criteria. In the case of surface and material analysis, various instances of local peaks and their amplitudes may be clustered based on their similarities and form separate classes such as hard, soft etc.

While the foregoing is directed to embodiments of the present invention, other and further embodiments of the invention may be devised without departing from the basic scope thereof, and the scope thereof is determined by the claims that follow.

What is claimed is:

1. A method for determining properties of at least one of a surface or a material adjacent to a portable device, comprising:
   receiving, with a processor, a signal from at least one of an accelerometer or a microphone;
   windowing, with the processor, a segment of the received signal to remove an edge transient;
   computing, with the processor, a Fast Fourier Transform (FFT) and a power spectral density of the signal;
   determining, with the processor, a peak in spectral energy at a frequency of the signal;
   finding, with the processor, local peaks by determining a difference in the power spectral density or an FFT amplitude is relation to a pre-determined threshold;
   computing, with the processor, harmonic energy according to the local peaks and their differences; and
   determining, with the processor, at least one property of the surface or material based on the harmonic energy.

2. The method of claim 1, wherein computing the power spectral density includes computing $20*\log_{10}(abs(FFT))$.

3. The method of claim 1, wherein the frequency is a vibration frequency of a haptics actuator.

4. The method of claim 1, wherein finding the local peaks includes searching for regions where there is a sudden drop in neighboring amplitudes.

5. The method of claim 1 further comprising recording locations of the local peaks and amplitudes of the local peaks.

6. The method of claim 1, wherein the local peaks occur at multiples of a vibrating or resonant frequency of the substance.

7. The method of claim 1, wherein the at least one property relates to at least one of a mass, an elasticity, a damping and a resonant frequency of the surface or the material.

8. The method of claim 1 further comprising:
computing individual harmonics;
extracting salient features relating to at least one of a number of the local peaks, an energy at a vibrating frequency, and significant peaks; and
comparing the salient features to at least one of a fixed reference set or different instances.

9. The method of claim 1, further comprising:
vibrating the surface or the material with a haptics actuator.

10. The method of claim 9, wherein receiving the signal includes receiving the signal while the surface or the material is vibrated with the haptics actuator.

11. The method of claim 10, wherein the haptics actuator is mounted on the surface or the material.

12. The method of claim 9, wherein the haptics actuator is mounted on the surface or the material.

13. An apparatus for surface and material analysis, comprising:
a processor;
a haptic driver coupled to the processor;
an actuator and at least one of a microphone and an accelerometer, wherein the actuator and the at least one of the microphone and the accelerometer are coupled to the haptic driver,
wherein the actuator is actuated to a pattern by the processor through the haptic driver, and wherein the processor processes data from at least one of the microphone and the accelerometer when the haptic device is actuated, determines a strength of two or more harmonic frequencies in the processed data, and determines at least one property of the surface or material based on the strength of the two or more harmonic frequencies.

14. The apparatus of claim 13, wherein the processor alters a setting of a portable device based on the determination of the at least one property of the surface or the material.

15. A method for determining at least one of a surface or a material adjacent to a portable device, comprising:
receiving data from at least one of a microphone and an accelerometer;
computing a frequency response of the data;
extracting harmonic energy of the computed frequency response;
comparing the extracted harmonic energy to a pre-determined threshold; and
determining the at least one of the surface and the material adjacent to the portable device based on the comparison.

16. The method of claim 15 further comprising altering a setting of the portable device based on the determination of the at least one of the surface or the material.

17. The method of claim 15, further comprising:
vibrating the surface or the material with a haptics actuator.

18. The method of claim 17, wherein receiving the data includes receiving the data while the surface or the material is being vibrated with the haptics actuator.

19. The method of claim 18, wherein the haptics actuator is mounted on the surface or the material.

20. The method of claim 17, wherein the haptics actuator is mounted on the surface or the material.

* * * * *